(12) United States Patent
Sano

(10) Patent No.: US 7,791,333 B2
(45) Date of Patent: Sep. 7, 2010

(54) ABSOLUTE ANGLE DETECTING APPARATUS

(75) Inventor: Tadashi Sano, Miyagi-ken (JP)

(73) Assignee: Alps Electric Co. Ltd., Tokyo (JP)

( * ) Notice: Subject to any disclaimer, the term of this patent is extended or adjusted under 35 U.S.C. 154(b) by 395 days.

(21) Appl. No.: 11/943,276

(22) Filed: Nov. 20, 2007

(65) Prior Publication Data

US 2008/0122437 A1    May 29, 2008

(30) Foreign Application Priority Data

Nov. 24, 2006  (JP)  ............................ 2006-317269

(51) Int. Cl.
  *G01B 7/30* (2006.01)
  *G01C 1/00* (2006.01)
(52) U.S. Cl. .................................. 324/207.25; 702/151
(58) Field of Classification Search .............. 324/207.2, 324/207.21, 207.25, 252, 173, 174, 178, 324/179; 33/1 PT; 702/150, 151
See application file for complete search history.

(56) References Cited

U.S. PATENT DOCUMENTS

| | | | | |
|---|---|---|---|---|
| 6,326,781 | B1 * | 12/2001 | Kunde et al. | 324/207.21 |
| 6,622,388 | B2 * | 9/2003 | Meyer et al. | 33/1 PT |
| 6,633,827 | B2 * | 10/2003 | Dietmayer | 702/130 |
| 7,073,398 | B2 * | 7/2006 | Kondo et al. | 73/862.326 |
| 2002/0190709 | A1 * | 12/2002 | Frederick et al. | 324/207.2 |
| 2003/0171891 | A1 * | 9/2003 | Okumura | 702/151 |
| 2005/0242802 | A1 * | 11/2005 | Matsumoto et al. | 324/174 |
| 2006/0136169 | A1 * | 6/2006 | Shonai et al. | 702/145 |

FOREIGN PATENT DOCUMENTS

JP    2006-047228    2/2006

* cited by examiner

*Primary Examiner*—Kenneth J Whittington
(74) *Attorney, Agent, or Firm*—Brinks Hofer Gilson & Lione

(57) ABSTRACT

The disclosed absolute angle detecting apparatus includes: a rotating body A; a rotating magnet that rotates with the rotation of the rotating body A; and a magnetic sensor that outputs signals sin θ, cos θ, −sin θ, and −cos θ using a variation in the direction of a magnetic field according to the rotation angle θ of the rotating magnet. The first and second arc tangent signals $\tan^{-1}\theta$ having phases that deviate from each other by a quarter of the period of each output signal of the magnetic sensor are generated on the basis of the output signals of the magnetic sensor. The absolute angle detecting apparatus generates a sawtooth signal without using the vicinities of the switching positions of the two arc tangent signals $\tan^{-1}\theta$, and detects the absolute angle of the rotating body A within one rotation of the rotating body A, on the basis of the sawtooth signal.

6 Claims, 6 Drawing Sheets

SECTOR IDENTIFYING DIGITAL CODE

| SECTOR | 1 | 2 | 3 | 4 | 5 | 6 | 7 | 8 |
|--------|---|---|---|---|---|---|---|---|
| D1 | 1 | 1 | 1 | 1 | 0 | 0 | 0 | 0 |
| D2 | 0 | 0 | 1 | 1 | 1 | 1 | 0 | 0 |
| D3 | 1 | 0 | 0 | 0 | 0 | 1 | 1 | 1 |
| D4 | 1 | 1 | 1 | 0 | 0 | 0 | 0 | 1 |

ABSOLUTE ANGLE DETECTING APPARATUS

CLAIM OF PRIORITY

This application claims benefit of the Japanese Patent Application No. 2006-317269 filed on Nov. 24, 2006, which is hereby incorporated by reference in its entirety.

BACKGROUND

1. Field of the Invention

The present invention relates to an absolute angle detecting apparatus, and more particularly, to an absolute angle detecting apparatus that calculates an arc tangent ($\tan^{-1}\theta$), on the basis of a sine signal and a cosine signal that are output from a magnetic sensor provided in a rotating body, and calculates the rotation angle of the rotating body on the basis of the arc tangent.

2. Description of the Related Art

A rotation angle detecting apparatus including a plurality of magnetic detecting elements that output a sine signal and a cosine signal corresponding to the relative rotation angle θ of a rotating body and an arithmetic unit that calculates an arc tangent on the basis of the sine signal and the cosine signal output from the plurality of magnetic detecting elements and then calculates a rotation angle between the rotating body and the magnetic detecting elements on the basis of the arc tangent has been proposed. For example, Hall elements or magnetoresistive elements are used as the magnetic detecting elements (for example, see JP-A-2006-47228 (FIGS. 1 to 4)).

The rotation angle detecting apparatus does not directly calculate the rotation angle of the rotating body from the sine signal and the cosine signal that are output from the magnetic detecting elements, but calculates an arc tangent on the basis of the sine signal and the cosine signal and then calculates the rotation angle of the rotating body on the basis of the arc tangent.

However, the rotation angle detecting apparatus including the plurality of magnetic detecting elements has a problem in that it is difficult to accurately calculate the rotation angle of a rotating body in the vicinities of switching positions due to positional deviation between the original switching positions and the switching positions of an arc tangent signal. That is, the switching positions of the arc tangent signal from a portion in which the arc tangent signal rises linearly to a portion in which the art tangent signal falls rapidly (for example, positions corresponding to angles of 0°, 180°, and 360° in FIG. 6). This is caused by, for example, a variation in the characteristics of the plurality of magnetic detecting elements, a variation in voltage applied to or output from each of the magnetic detecting elements, a variation in the phase of an output signal (a sine wave or a cosine wave) due to the misalignment of the magnetoresistive elements, and backlash of a speed increasing mechanism, as shown in FIG. 6.

SUMMARY

According to an aspect of the disclosure, an absolute angle detecting apparatus includes: a rotating body; a rotating magnet that rotates with the rotation of the rotating body; and a magnetic sensor that outputs signals sin θ, cos θ, −sin θ, and −cos θ using a variation in the direction of a magnetic field according to the rotation angle θ of the rotating magnet. In the absolute angle detecting apparatus, first and second arc tangent signals $\tan^{-1}\theta$, having phases that deviate from each other by a quarter of the period of each of the signals output from the magnetic sensor, are generated from the output signals of the magnetic sensor. The first arc tangent signal $\tan^{-1}\theta$ is switched to the second arc tangent signal $\tan^{-1}\theta$ at an intersecting point between the signal sin θ and the signal cos θ, an intersecting point between the signal −sin θ and the signal cos θ, an intersecting point between the signal sin θ and the signal −cos θ, and an intersecting point between the signal −sin θ and the signal −cos θ, or the second arc tangent signal $\tan^{-1}\theta$ is switched to the first arc tangent signal $\tan^{-1}\theta$ at these intersecting points, thereby generating a sawtooth signal. The rotation angle of the rotating body within one rotation is detected, on the basis of the sawtooth signal.

An absolute angle detecting apparatus according to an embodiment generates the first and second arc tangent signals $\tan^{-1}\theta$, having phases that deviates from each other by a quarter of the period of each of the signals sin θ, cos θ, −sin θ, and −cos θ output from a magnetic sensor, on the basis of the output signals of the magnetic sensor. Then, the absolute angle detecting apparatus generates a sawtooth signal without using the vicinities of the switching portions of the first and second arc tangent signals $\tan^{-1}\theta$, and detects the absolute angle of a rotating body on the basis of the sawtooth signal. As a result, it is possible to accurately detect the absolute angle of a rotating body within one rotation of the rotating body.

DESCRIPTION OF THE EMBODIMENTS

Figure 1:
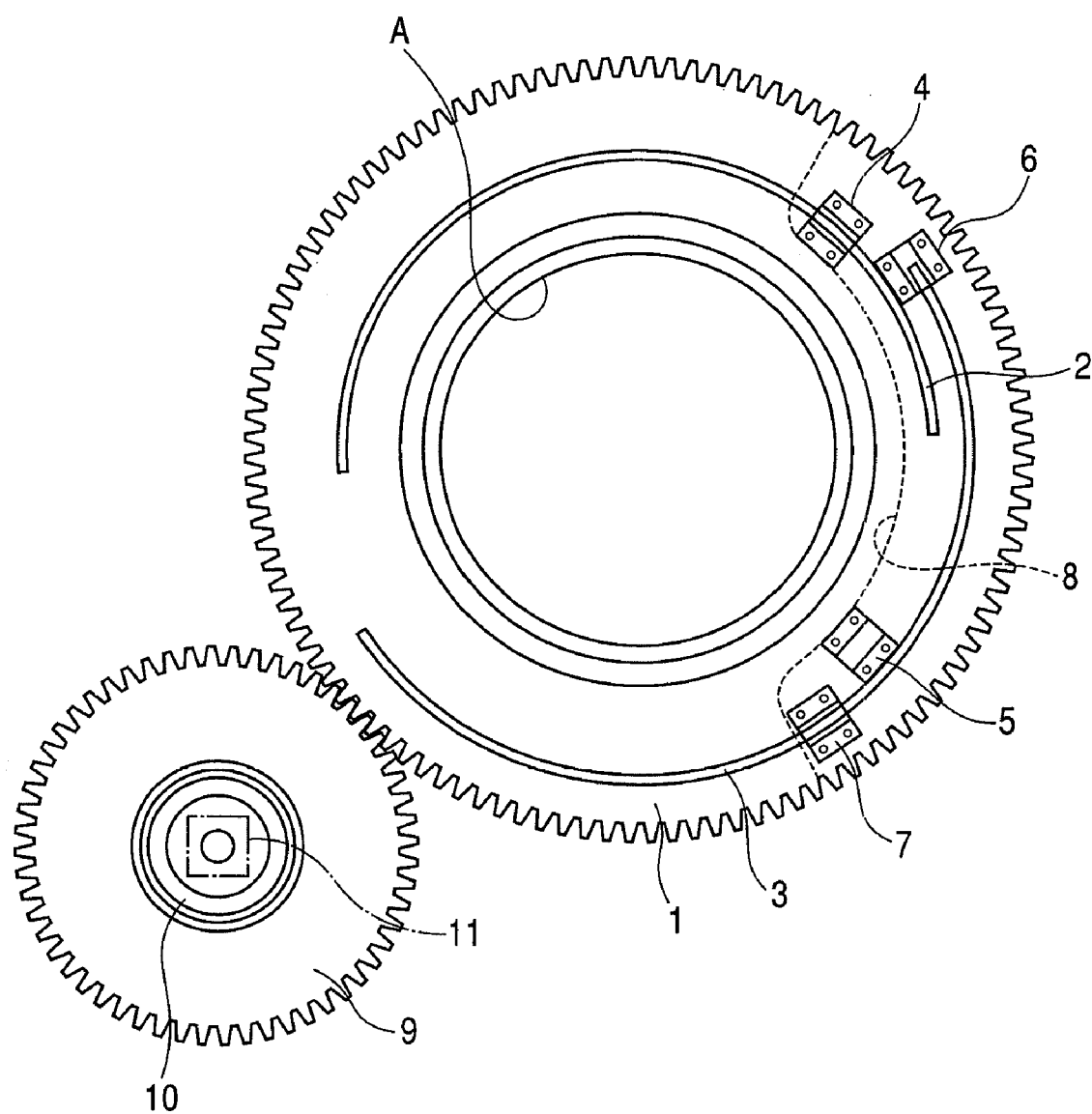
FIG. 1 is a diagram illustrating the structure of a speed increasing mechanism of an absolute angle detecting apparatus according to an embodiment of the disclosure.
Figures 2A, 2B:
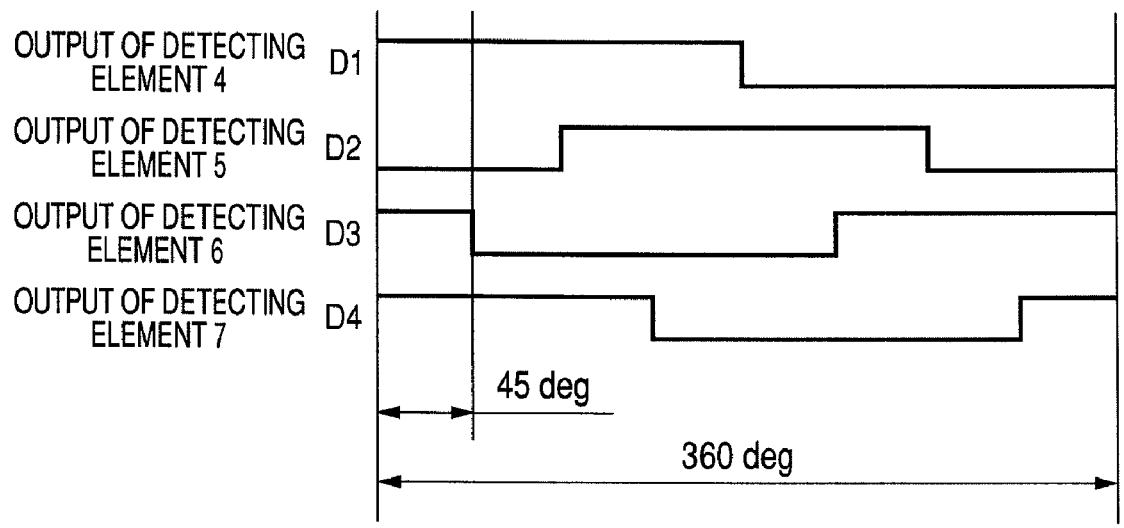
FIGS. 2A and 2B are diagrams illustrating the relationship between the output timing of signals from four detecting elements for identifying sectors and a sector identifying digital code string that is allocated to each of the sectors.
Figure 3:
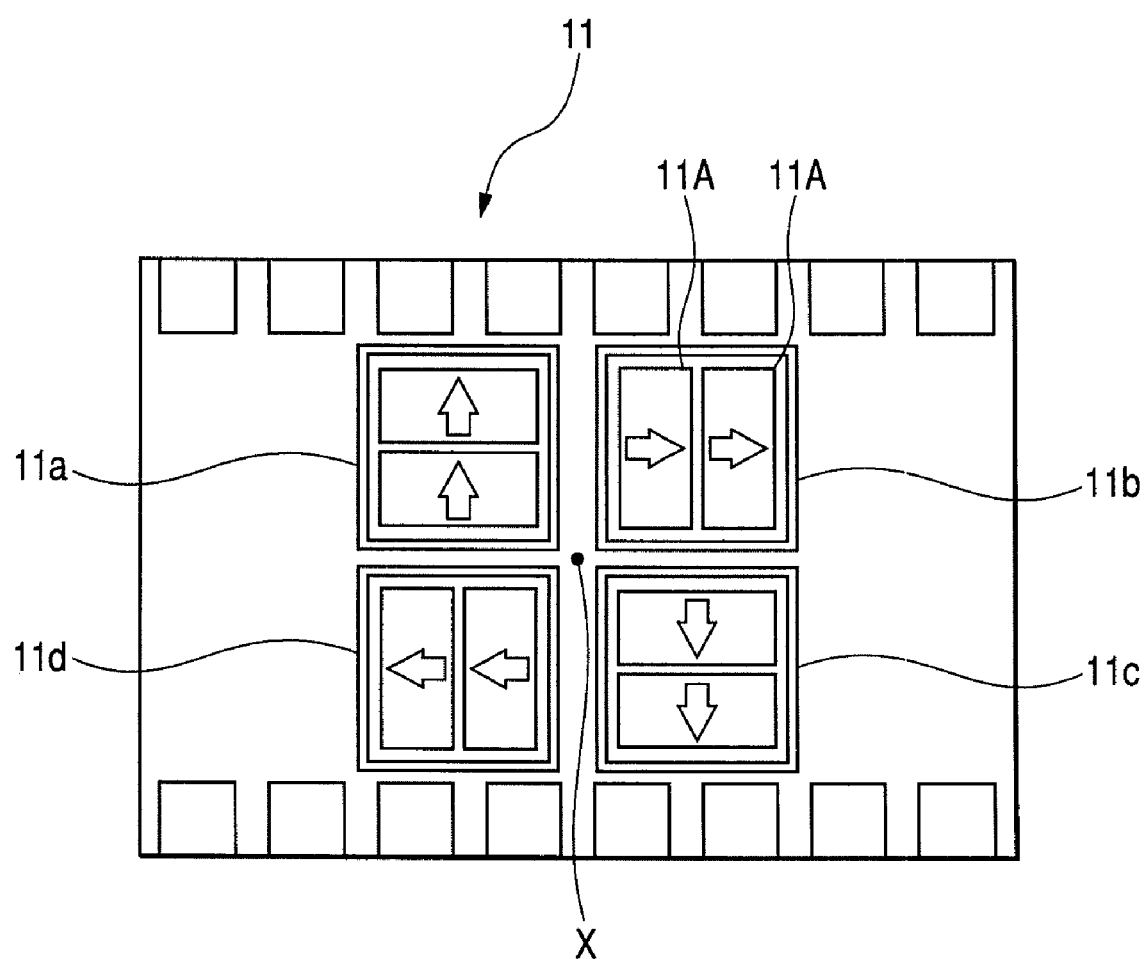
FIG. 3 is a diagram illustrating the structure of a magnetic sensor that is provided in the absolute angle detecting apparatus according to the embodiment of the disclosure.
Figure 4:
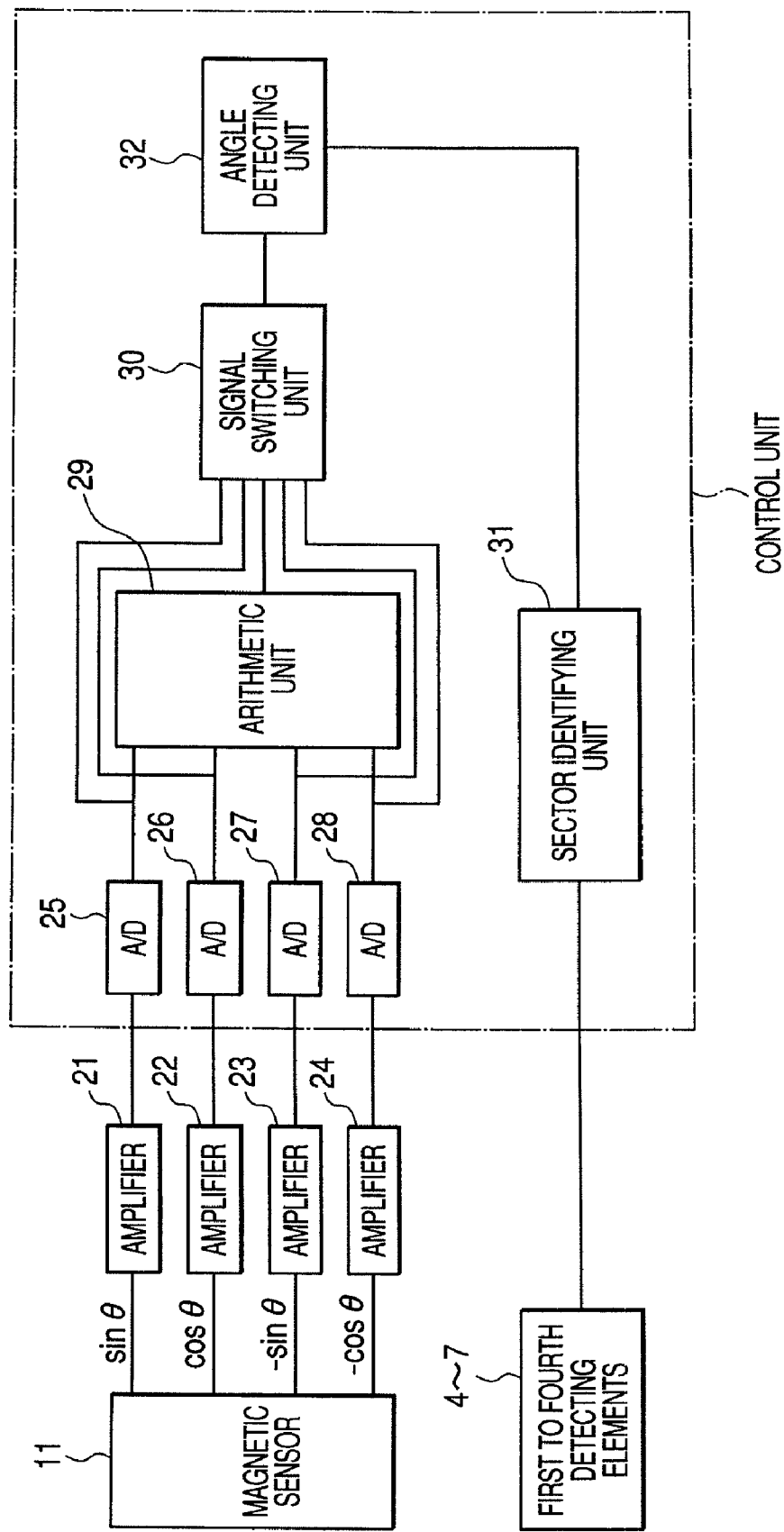
FIG. 4 is a block diagram illustrating the structure of a signal processing system of the absolute angle detecting apparatus according to the embodiment of the disclosure.
Figure 5:
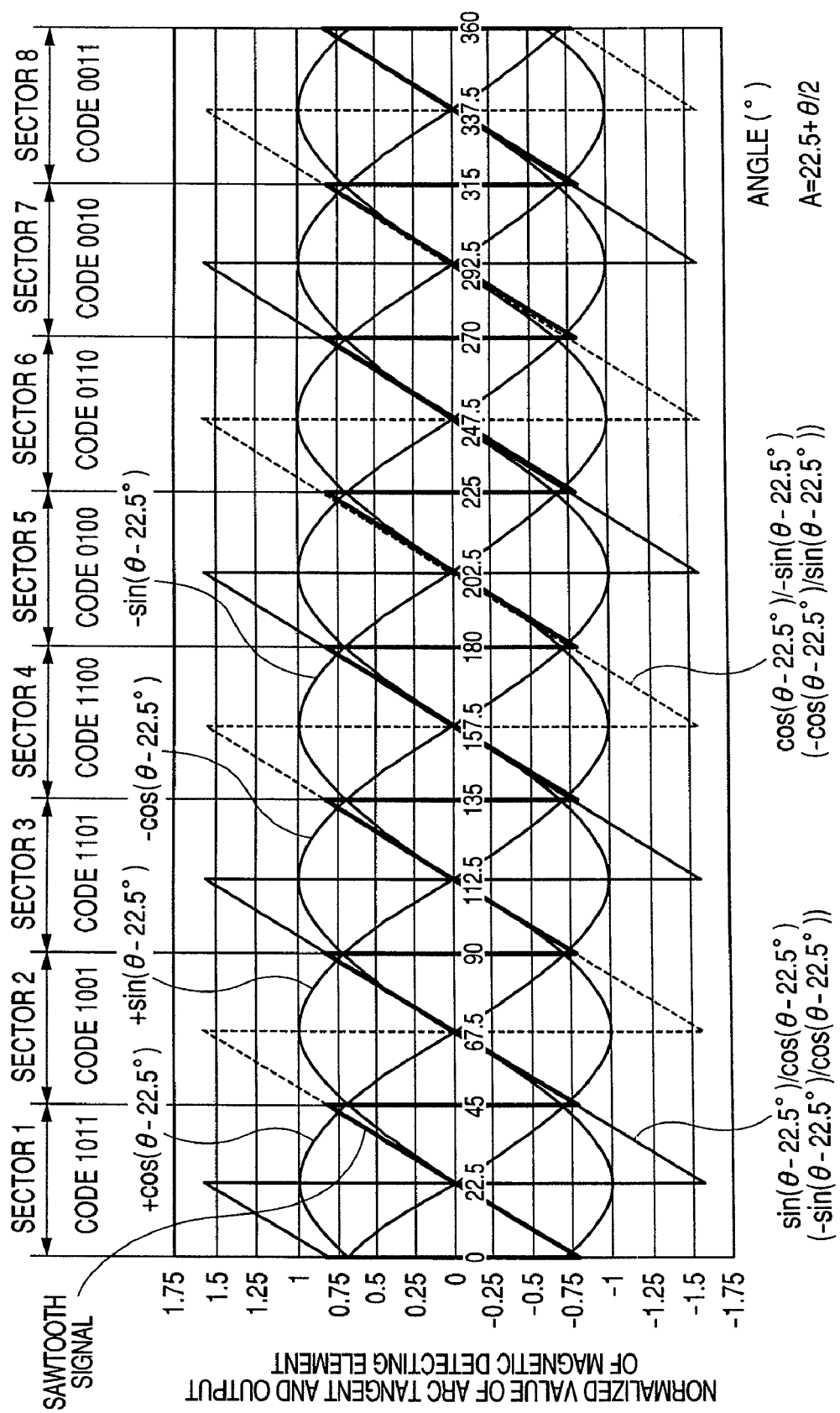
FIG. 5 is a graph illustrating the relationship among signals that are output from the magnetic sensor, first and second arc tangent signals $\tan^{-1}\theta$ that are generated from the output signals, a sawtooth signal that is generated from the first and second arc tangent signals $\tan^{-1}\theta$, and sector division.
Figure 6:
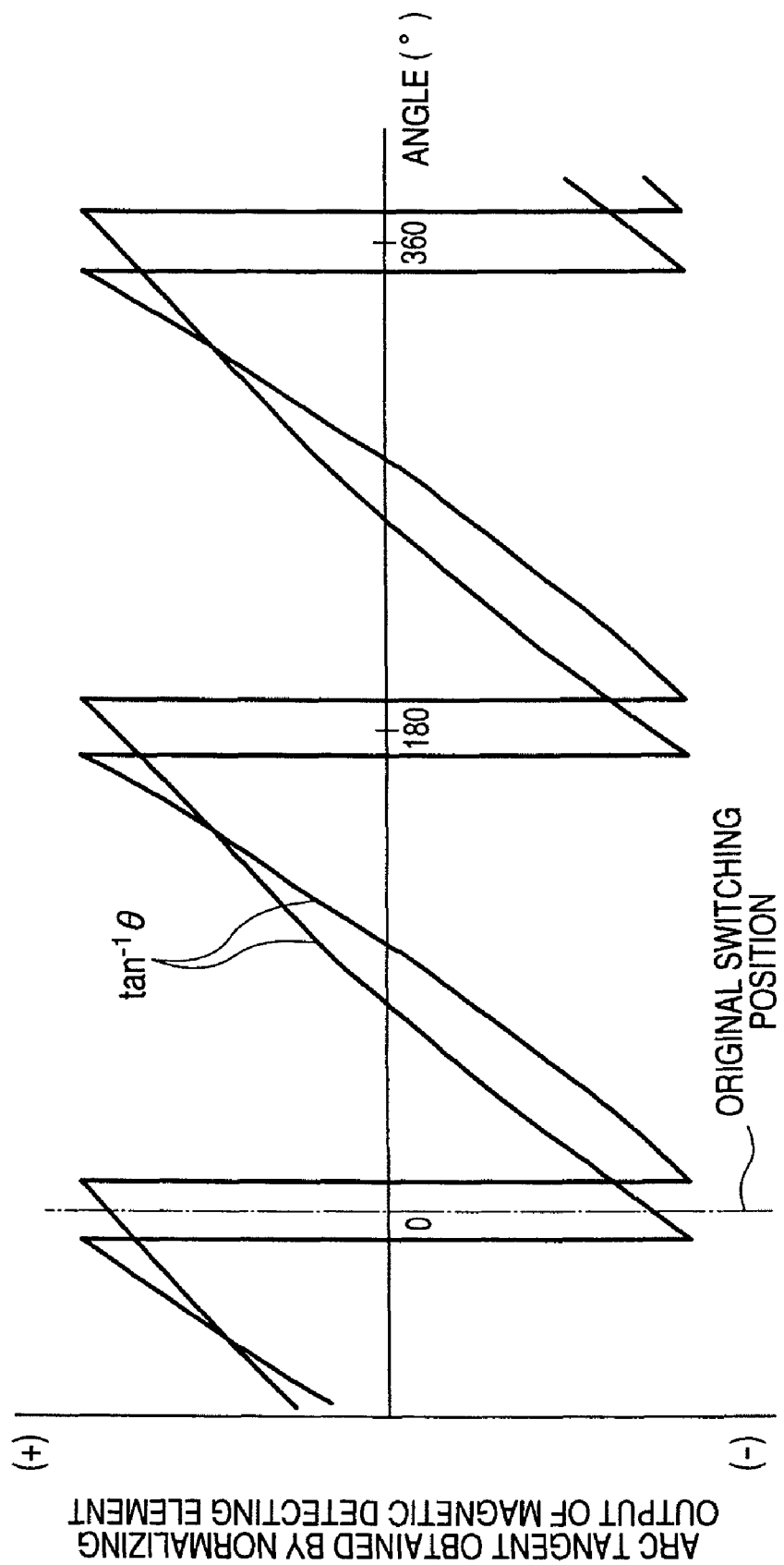
FIG. 6 is a graph illustrating the problem of the related art.

Hereinafter, an absolute angle detecting apparatus according to an embodiment of the disclosure will be described with reference to FIGS. 1 to 5. FIG. 1 is a diagram illustrating the structure of a speed increasing mechanism of an absolute angle detecting apparatus according to an embodiment of the disclosure. FIGS. 2A and 2B are diagrams illustrating the relationship between the output timing of signals from four magnetic detecting elements for identifying sectors and a sector identifying digital code string that is allocated to each of the sectors. FIG. 3 is a diagram illustrating the structure of a magnetic sensor provided in the absolute angle detecting apparatus according to the embodiment of the disclosure. FIG. 4 is a block diagram illustrating the structure of a signal processing system of the absolute angle detecting apparatus according to the embodiment of the disclosure. FIG. 5 is a graph illustrating the relationship among signals that are output from the magnetic sensor, first and second arc tangent signals $\tan^{-1}\theta$ that are generated from the output signals, a sawtooth signal that is generated from the first and second arc tangent signals $\tan^{-1}\theta$, and sector division. FIG. 6 is a graph illustrating the problem of the related art.

As shown in FIG. 1, the absolute angle detecting apparatus according to this embodiment of the disclosure includes, as main components, a rotating body A, a first toothed wheel 1, serving as a code wheel that is concentric with the rotating axis of the rotating body A. First and second code patterns 2 and 3 are formed on the circumference having the rotation center of the first toothed wheel 1 as its center. First and second detecting elements 4 and 5 are provided opposite to the first code pattern 2. Third and fourth detecting elements 6 and 7 are provided opposite to the second code pattern 3. A circuit board 8 has the first to fourth detecting elements 4 to 7 mounted thereon. A second toothed wheel 9 engages with the first toothed wheel 1, rotates with the rotation of the first toothed wheel 1, and has a rotating axis that is parallel to the rotating axis of the rotating body A. A ring-shaped rotating magnet 10 is mounted to the second toothed wheel 9 so as to be concentric with the rotation center of the second toothed wheel 9. A magnetic sensor 11 outputs signals $\sin\theta$, $\cos\theta$, $-\sin\theta$, and $-\cos\theta$ having one rotation of the second toothed wheel 9 (the rotating magnet 10) as one period using a variation in the direction of a magnetic field according to the rotation angle $\theta$ of the rotating magnet 10.

The first toothed wheel 1 and the second toothed wheel 9 form a speed increasing mechanism of the rotating magnet 10 for the rotating body A. In the speed increasing mechanism, the number of teeth of the second toothed wheel is smaller than that of the first toothed wheel 1 such that the number of rotations of the second toothed wheel 9 is larger than that of the first toothed wheel 1, and the number of teeth of each of the first and second toothed wheels is set according to a speed increasing ratio. The speed increasing ratio can be set to an arbitrary value. However, in this embodiment, the speed increasing ratio may be set to a multiple of a natural number that is equal to or greater than 2, in order to easily set sectors that are obtained by dividing one rotation of the rotating body A and to easily detect the rotation angle of the rotating body within each of the divided sectors. In this embodiment, the number of teeth of the first toothed wheel 1 is set to 112, and the number of teeth of the second toothed wheel 9 is set to 56, so that the second toothed wheel 9 (the rotating magnet 10) makes two rotations while the first toothed wheel 1 (the rotating body A) makes one rotation.

The first and second code patterns 2 and 3 each have a light shielding plate, and photo interrupters, each formed by combining a light emitting element with a light receiving element, are used as the first to fourth detecting elements 4 to 7. The first to fourth detecting elements 4 to 7 are mounted on the circuit board 8 such that the light emitting element and the light receiving element are provided at both sides of each of the first and second code patterns 2 and 3. In the absolute angle detecting apparatus according to this embodiment, the first and second code patterns 2 and 3 and the first to fourth detecting elements 4 to 7 are arranged on the first toothed wheel 1 such that the first to fourth detecting elements 4 to 7 output signals D1 to D4 at the timing shown in FIG. 2B, respectively, while the first toothed wheel 1 (the rotating body A) makes one rotation.

As shown in FIG. 2B, when a high-level signal is referred to as '1' and a low-level signal is referred to as '0' in the output signals D1 to D4, digital code strings, each composed of the output signals D1 to D4, are different from each other for eight sectors that are obtained by equally dividing one rotation of the first toothed wheel, as shown in FIG. 2A. These digital code strings are output as sector identifying signals from the sector identifying unit 31 shown in FIG. 4. When one rotation of the first toothed wheel 1 (the rotating body A) is equally divided into eight sectors (one sector is 45°), different digital codes can be allocated to the sectors. Therefore, it is possible to identify the sectors by detecting these digital codes.

As shown in FIG. 3, the magnetic sensor 11 includes four magnetic detecting elements 11a, 11b, 11c, and 11d, and each of the magnetic detecting elements has two rectangular magnetoresistive elements 11A that are magnetized in their lateral directions. In addition, the magnetic detecting elements 11a, 11b, 11c, and 11d are formed such that the magnetized directions thereof are orthogonal to each other. In this way, a bridge circuit (not shown) having eight magnetoresistive elements as resistive elements is formed, and the bridge circuit is mounted on a substrate that is fixed to a fixing member (not shown). Each of the magnetoresistive elements is formed of a ferromagnetic film having an anisotropic magnetoresistance effect, and the resistance value thereof is changed according to the direction of a magnetic field applied to the magnetic sensor (a variation in the direction of the magnetic field).

Since a point X that is equidistant from the magnetic detecting elements 11a, 11b, 11c, and 11d is concentric with the rotation center of the rotating magnet 10, the rotation of the rotating magnet 10 causes the magnetic detecting elements 11a, 11b, 11c, and 11d to respectively output signals $\sin\theta$, $\cos\theta$, $-\sin\theta$, and $-\cos\theta$ having phases that deviate from each other by a quarter period (45°). In the absolute angle detecting apparatus according to this embodiment of the invention, since a speed increasing mechanism includes the first and second toothed wheels 1 and 9 that are provided such that the rotating magnet 10 makes two rotations while the rotating body A makes one rotation, the magnetic detecting elements 11a, 11b, 11c, and 11d output the signals $\sin\theta$, $\cos\theta$, $-\sin\theta$, and $-\cos\theta$ corresponding to two periods, respectively, while the rotating body A makes one rotation. For example, magnetoresistive elements or Hall elements may be used as the magnetic detecting elements. It is preferable to use the magnetoresistive elements since little variation occurs in the output of the magnetoresistive element even when the temperature varies.

As shown in FIG. 4, a signal processing system of the absolute angle detecting apparatus according to this embodiment includes, as main components, first to fourth amplifiers 21 to 24 that amplify the signals $\sin\theta$, $\cos\theta$, $-\sin\theta$, and $-\cos\theta$ output from the magnetic sensor 11, A/D converters 25 to 28 that convert the amplified signals $\sin\theta$, $\cos\theta$, $-\sin\theta$, and $-\cos\theta$ into digital signals, an arithmetic unit 29 that calculates first and second arc tangent signals $\tan^{-1}\theta$, having phases that deviate from each other by a quarter of the period of each of the converted signals, that is, $\sin\theta/\cos\theta$ or $-\sin\theta/-\cos\theta$, and $\cos\theta/-\sin\theta$ or $-\cos\theta/\sin\theta$, on the basis of the converted signals $\sin\theta$, $\cos\theta$, $-\sin\theta$, and $-\cos\theta$, a signal switching unit 30 that switches the first and second arc tangent signals $\tan^{-1}\theta$ at an intersecting point between the signal $\sin\theta$ and the signal $\cos\theta$, an intersecting point between the signal $-\sin\theta$ and the signal $\cos\theta$, an intersecting point between the signal $\sin\theta$ and the signal $-\cos\theta$, and an intersecting point between the signal $-\sin\theta$ and the signal $-\cos\theta$ to generate a sawtooth signal for detecting an angle, a sector identifying unit 31 that identifies a plurality of sectors formed by equally dividing one rotation of the rotating body A, on the basis of 4-bit digital codes that are input from the first to fourth detecting elements 4 to 7, and an angle detecting unit 32 that detects the rotation angle of the rotating body A on the basis of the sawtooth signal for detecting an angle that is output from the signal switching unit 30 and the sector identifying signal that is output from the sector identifying unit 31.

In this embodiment, as shown in FIG. 5, a sine signal and a cosine signal each have an initial phase of 22.5°, but the invention is not limited thereto. The initial phase of each of the sine signal and the cosine signal may be zero or other values. First, in FIG. 5, sin(θ−22.5°), cos(θ−22.5°), −sin(θ−22.5°), and −cos(θ−22.5°) indicate signals output from the magnetic detecting elements 11a, 11b, 11c, and 11d, respectively, and the output signals are output for two periods while the rotating body A makes one rotation, so that the phases of the output signals deviate from each other by a quarter period. In FIG. 5, a first arc tangent signal tan$^{-1}$(θ−22.5°) corresponding to sin(θ−22.5°)/cos(θ−22.5°) or −sin(θ−22.5°)/−cos(θ−22.5°) is represented by a solid line, and a second arc tangent signal tan$^{-1}$(θ−22.5°) corresponding to cos(θ−22.5°)/−sin(θ−22.5°) or −cos(θ−22.5°)/sin(θ−22.5°) is represented by a dashed line. The first and second arc tangent signals tan$^{-1}$(θ−22.5°) deviate from each other by a quarter of the period of the signal output from each of the magnetic detecting elements.

The signal switching unit 30 shown in FIG. 4 switches the first and second arc tangent signals tan$^{-1}$(θ−22.5°) at an intersecting point between the signal sin(θ−22.5°) and the signal cos(θ−22.5°), an intersecting point between the signal −sin(θ−22.5°) and the signal cos(θ−22.5°), an intersecting point between the signal sin(θ−22.5°) and the signal −cos(θ−22.5°), and an intersecting point between the signal −sin(θ−22.5°) and the signal −cos(θ−22.5°) to generate a sawtooth signal corresponding to eight periods during one rotation of the rotating body A, as represented by a bold solid line in FIG. 5.

Specifically, the signal switching unit 30 switches the first arc tangent signal tan$^{-1}$(θ−22.5°) to the second arc tangent signal tan$^{-1}$(θ−22.5°) at the intersecting point between the signal sin(θ−22.5°) and the signal −cos(θ−22.5°) or the intersecting point between the signal −sin(θ−22.5°) and the signal cos(θ−22.5°), and switches the second arc tangent signal tan$^{-1}$(θ−22.5°) to the first arc tangent signal tan$^{-1}$(θ−22.5°) at the intersecting point between the signal −sin(θ−22.5°) and the signal −cos(θ−22.5°) or the intersecting point between the signal sin(θ−22.5°) and the signal cos(θ−22.5°). Then, the angle detecting unit 32 shown in FIG. 4 makes the arc tangent signal tan$^{-1}$(θ−22.5°) having an angle of 45° as one period that is output from the signal switching unit 30 correspond to the sector identifying signal that is output from the sector identifying unit 31, which makes it possible to detect the rotation angle of the rotating body A at a resolution of 0.5° or less.

For example, in order to divide one rotation of the rotating body A into sixteen sectors and detect the absolute angle of the rotating body A, the number of teeth of the first toothed wheel 1 and the number of teeth of the second toothed wheel 9 may be set such that, while the first toothed wheel 1 makes one rotation (360°), the second toothed wheel 9 makes four rotations, and an arc tangent signal tan$^{-1}$θ having an angle of 22.5° as one period that is generated by the signal switching unit 30 may correspond to the sector identifying signals, which are sixteen different digital code strings for the divided sectors.

As described above, the absolute angle detecting apparatus according to this embodiment generates a sawtooth signal, without directly using the first and second arc tangent signals tan$^{-1}$θ as angle detecting signals and using the vicinities of the switching positions of the signals, and detects the rotation angle of the rotating body A on the basis of the sawtooth signal. As a result, it is possible to accurately detect the absolute angle of a rotating body within one rotation of the rotating body, even when the switching positions of the first and second arc tangent signals tan$^{-1}$θ deviate from the original switching positions due to, for example, a variation in the characteristics of the plurality of magnetic detecting elements 11a to 11d provided in the absolute angle detecting apparatus, a variation in voltage applied to or output from each of the magnetic detecting elements 11a to 11d, a variation in the phase of an output signal (a sine wave or a cosine wave) caused by the misalignment of the magnetoresistive elements 11a to 11d, and backlash between the first toothed wheel 1 and the second toothed wheel 9.

Furthermore, according to the absolute angle detecting apparatus of this embodiment, one rotation of the rotating body is divided into eight sectors such that each sector has an angle of 45°, which makes it possible to detect the absolute angle of the rotating body at a resolution of 0.5° or less using the sawtooth signal. In addition, since the number of teeth of the second toothed wheel is smaller than that of the first toothed wheel 1, the number of sectors allocated to one rotation of the rotating body is reduced. As a result, it is possible to detect the rotation angle of a rotating body at high resolution.

In the speed increasing mechanism according to this embodiment, the first toothed wheel 1 (the code wheel) engages with the second toothed wheel 9 having a rotating axis that is parallel to the rotating axis of the rotating body A, and the rotating magnet 10 is integrally formed with the second toothed wheel 9. In this way, it is possible to simplify the structure of the speed increasing mechanism of the absolute angle detecting apparatus. However, the invention is not limited to the above-mentioned structure. For example, the following structure may be used: a code wheel without a gear is used as the first toothed wheel 1; a toothed wheel is provided in the rotating body A; and the toothed wheel engages with the second toothed wheel 9 having a rotating axis that is parallel to the rotating axis of the rotating body A. As another structure, a gear may be formed in the rotating body A, and the gear may engage with the second toothed wheel 9 having a rotating axis that is parallel to the rotating axis of the rotating body A.

Furthermore, in the above-described embodiment, the digital code detecting unit is formed by combining the light shielding plate with the photo interrupter, but the invention is not limited thereto. The digital code detecting unit may be formed by, for example, a combination of an optical pattern, such as clearance holes or cutouts, and the photo interrupter, a combination of a magnetic pattern and the magnetic detecting elements, or a combination of a resistor pattern and a collecting brush.

The invention claimed is:

1. An absolute angle detecting apparatus comprising:
   a rotating body;
   a rotating magnet that rotates with the rotation of the rotating body; and
   a magnetic sensor that outputs signals sin θ, cos θ, −sin θ, and −cos θ using a variation in the direction of a magnetic field according to the rotation angle θ of the rotating magnet,
   wherein first and second arc tangent signals tan−1θ, having phases that deviate from each other by a quarter of the period of each of the signals output from the magnetic sensor, are generated from the output signals of the magnetic sensor,
   the first arc tangent signal tan−1θ is switched to the second arc tangent signal tan−1θ at an intersecting point between the signal sin θ and the signal cos θ, an intersecting point between the signal −sin θ and the signal cos θ, an intersecting point between the signal sin θ and the signal −cos θ, and an intersecting point between the signal −sin θ and the signal −cos θ, or the second arc tangent signal tan−1θ is switched to the first arc tangent signal tan−1θ at these intersecting points, thereby generating a sawtooth signal, and the rotation angle of the rotating body within one rotation is detected, on the basis of the sawtooth signal.

2. The absolute angle detecting apparatus according to claim 1,
wherein one rotation of the rotating body is divided into 8n sectors (where n is a natural number), and
the rotation angle of the rotating body within each of the sectors is detected on the basis of the sawtooth signal corresponding to each of the sectors.

3. The absolute angle detecting apparatus according to claim 2, further comprising:
a code wheel that is provided on the rotating body so as to be concentric with a rotating axis of the rotating body;
code patterns that are provided on the code wheel so as to correspond to digital code strings for identifying the sectors; and
code detecting elements that are provided opposite to the code patterns.

4. The absolute angle detecting apparatus according to claim 3, further comprising:
a speed increasing mechanism that connects the rotating magnet to the rotating body or the code wheel.

5. The absolute angle detecting apparatus according to claim 4,
wherein the speed increasing mechanism includes:
a first toothed wheel that forms the code wheel; and
a second toothed wheel that has a rotating axis parallel to the rotating axis of the rotating body and engages with the first toothed wheel, and
the rotating magnet is provided such that the center thereof is aligned with the rotation center of the second toothed wheel.

6. The absolute angle detecting apparatus according to claim 1, further comprising:
a speed increasing mechanism that connects the rotating magnet to the rotating body or a code wheel.

* * * * *